United States Patent [19]
Guyer

[11] Patent Number: 6,130,624
[45] Date of Patent: Oct. 10, 2000

[54] TALKING REMOTE CONTROL

[75] Inventor: Thomas W. Guyer, Minneapolis, Minn.

[73] Assignee: Winsor Entertainment Corporation, St. Paul, Minn.

[21] Appl. No.: 08/872,409

[22] Filed: Jun. 10, 1997

[51] Int. Cl.[7] .................................................. H04Q 1/00
[52] U.S. Cl. .................... 340/825.69; 341/176; 367/197; 348/734
[58] Field of Search ........................ 340/825.69, 825.72; 341/176; 367/197; 348/734

[56] References Cited

U.S. PATENT DOCUMENTS

| | | | |
|---|---|---|---|
| 4,314,236 | 2/1982 | Mayer | 340/825.69 |
| 4,366,482 | 12/1982 | Remes et al. | 340/825.69 |
| 4,428,685 | 1/1984 | Lemelson et al. | 374/163 |
| 4,479,412 | 10/1984 | Klynas | 367/197 |
| 4,573,134 | 2/1986 | Ikemoto | 364/705 |
| 4,700,377 | 10/1987 | Yasuda et al. | 379/88 |
| 4,706,288 | 11/1987 | Hashimoto et al. | 381/51 |
| 4,914,431 | 4/1990 | Severson | 340/825.72 |
| 5,045,327 | 9/1991 | Tarlow et al. | 381/51 |
| 5,095,503 | 3/1992 | Kowalski | 579/59 |
| 5,097,856 | 3/1992 | Chi-Sheng | 135/72 |
| 5,111,530 | 5/1992 | Kutaragi et al. | 395/20 |
| 5,253,068 | 10/1993 | Crook | 340/825.72 |
| 5,267,318 | 11/1993 | Severson et al. | 381/51 |
| 5,495,357 | 2/1996 | Osterhout | 340/825.72 |
| 5,504,836 | 4/1996 | Loudermilk | 395/2.81 |

*Primary Examiner*—Brian Zimmerman
*Attorney, Agent, or Firm*—Kinney & Lange, P.A.

[57] ABSTRACT

A remote control device having buttons with a primary function of activating generation of a control signal by the remote and secondary function of activating generation of an audio sample. The audio sample is unrelated to the primary, functional signal generated by pressing that button. The remote control device may include several different sets of audio samples, each set being associated with a particular television program, a particular theme or genre, and/or a particular component. The selection of the particular sample played by pressing a button may be done by switching, at random, or by a combination of both. The remote control may (a) generate control signals in silence, or (b) generate control signals in conjunction with audio features, or (c) generate audio features without generation of control signals.

17 Claims, 2 Drawing Sheets

TALKING REMOTE CONTROL

BACKGROUND OF THE INVENTION

The present invention relates to remote controls, and, more particularly, to remote controls for commanding audio/visual type components such as television sets ("TVs"), video cassette recorders ("VCRs"), stereo receivers, compact disc ("CD") players, etc.

Various remote control devices have existed in the past. Some remote control devices, such as for a garage door, may consist of a single button which generates a single command signal.

Other remote control devices, such as those used for components such as TVs, VCRs, television cable boxes, stereo receivers, CD players, cassette tape players and other audio or visual equipment often have numerous buttons and generate numerous commands. For instance, TV, VCR and cable box remote controls may include channel up and channel down buttons, a return channel button, volume up and down buttons, a mute button, and numerical buttons 1 through 0. VCR and cassette tape player remote controls often include buttons such as play, stop, pause, fast forward, rewind, and record. Remote controls for all types of components include a power button to activate the component. Numerous other buttons may be included to control particular features of the component being driven.

Modern remote control structures generally operate based on the emission and reception of non-visible electromagnetic radiation, such as radio waves or infrared light. When a button on the remote is pressed, an emitter in the remote sends a command signal associated with the button pressed. Components controlled by remotes include an electromagnetic sensor for detecting electromagnetic radiation of the type emitted by the remote. The electromagnetic radiation received by the sensor is typically transformed into a corresponding electrical signal, which is filtered and scanned for command signals emitted by the remote. Switching in the component is completed based on the sensed command signal, such that the button pressed on the remote control operates as if it were pressed on the component itself.

"Universal" remote control devices have also existed for some time. A "universal" remote can command any of a number of different components. For instance, a single universal remote may be able to command two or more of the TV, the VCR, the cable box, the stereo receiver, and the CD player. Additionally, a single universal remote may be able to command any of several different manufacturer's components and/or any of several different models of components manufactured by a single manufacturer.

Various audio playback devices have existed in the past, and some previous remote controls have included audio features. For instance, U.S. Pat. No. 4,366,482 discloses a remote control for a garage door opener which has an audio transducer connected in parallel with the emitter to produce a buzzer tone when the button on the remote control is pressed.

Many types of electronic devices other than audio/visual component remote controls have previously existed with numerical buttons 1 through 0 for inputting information. Some of these electronic devices have audio voiced or talking features associated within their numerical buttons. For instance, U.S. Pat. Nos. 4,573,134 and 4,700,377 each disclose an electronic device which voices a number (i.e., stating "one") to indicate the numeric button ("1") pressed.

BRIEF SUMMARY OF THE INVENTION

The present invention is a remote control device having buttons with a primary function of activating generation of the control signal by the remote. These buttons also have a secondary function activating generation of an audio sample. The audio sample is unrelated to the primary, functional signal generated by pressing that button.

In one aspect of the invention, a universal remote has numeric buttons associated with it. The remote not only has a primary function of sending numeric signals to the component, but also has a secondary function of playing audio samples unassociated with the signals sent. For instance, with the universal remote directed for television, pressing the numeric button "1" would not only activate generation of a command signal for television channel "1", but would also play the audio sample "He could GO . . . ALL . . . THE . . . WAY!!!" voiced by Chris Berman of ESPN's "NFL PRIME TIME". The remote control device may include several different sets of audio samples, each set being associated with a particular television program, a particular theme or genre, and/or a particular component.

In another aspect of the invention, a switching button is provided on the remote control which activates and deactivates the audio sampling feature. The remote control may (a) generate command signals in silence, or (b) generate command signals in conjunction with audio features, or (c) generate audio features without generation of the command signals.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
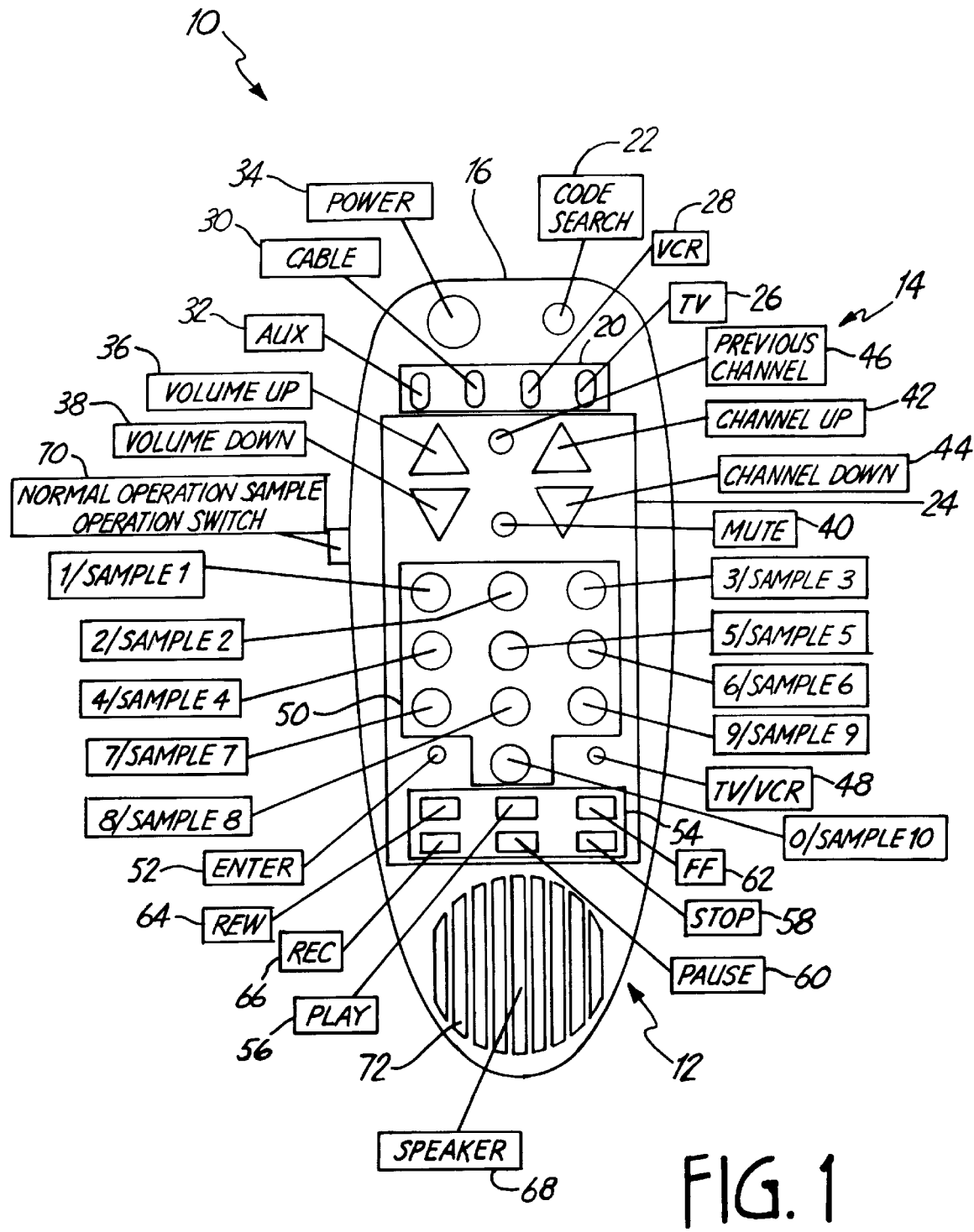
FIG. 1 is a top view of a remote control device in accordance with the present invention.

The preferred remote control device of the present invention is a universal remote 10. The remote 10 includes a housing 12 with a plurality of buttons 14 on a top face of the housing 12. Each of the buttons 14 is labeled, such as by printing either on the button 14 or on the housing 12 immediately adjacent the button 14. An emitter 16 sends command signals out of the front of the housing 12. A power source 18 (not shown in FIG. 1), such as two or four AA or AAA sized batteries, powers the remote 10 so the remote 10 is in an active state, ready to be used by pushing a button 14.

The command signals sent are typical of universal remote controls. The preferred emitter 16 is a light emitting diode ("LED") which operated in the infrared range. As known in the art, each of the buttons 14, when pressed, makes an electrical connection within the housing 12. When this connection is made, circuitry in the remote 10 causes the LED 16 to emit a command signal which is modulated (either frequency modulated or amplitude modulated are possible) to be representative of the button 14 pressed for the particular component. The command signal sent is recognized by that component and associated with the button 14 pressed, and switching within the component is completed to effect the function of the button 14 pressed.

The remote 10 includes buttons 14 for a number of features typical of universal remote controls, including component selection buttons 20, a code search button 22, and signal buttons 24. Workers skilled in the art will appreciate that the buttons 14 provided can differ considerably depending upon the type and features of the component(s) controlled by the remote 10.

Four component selection buttons 20 are used to select the type of component which is controlled by the remote 10. The TV button 26 is used for a television set, the VCR button 28 is used for a video cassette recorder, the cable button 30 is used for a cable box, and the auxiliary button 32 is used for an auxiliary component of choice, such as a stereo receiver, a compact disc player, a cassette player, etc.

The code search button 22 is used during consumer programming of the universal remote 10 for the consumer's particular make/model of TV, VCR, cable box and/or auxiliary device. As known in the art, the code search button 22 allows the universal remote 10 to sample and read from the consumer's component, to thereby identify what menu of command signals should be used and associated with the remaining buttons 14 on the remote 10. Because consumers can individually program their remote 10 with the code search button 22, a single remote 10 can command any of several different manufacturer's components and/or any of several different models of components manufactured by a single manufacturer.

Pressing a component selection button 20 does not by itself cause a command signal to be generated by the remote 10. Instead, the remote 10 has number of stored menus of functions and command signals associated with those functions, with each menu particular to the type of component selected. The remote 10 is programmed to be ready to send/receive signals to the type of component specified by the component selection button 20 last pressed. The remote 10 is further programmed to be ready to send command signals to the particular make/model as identified through the code search procedure for that type of component.

For example, to ready the universal remote 10 for a particular television (for example, one manufactured by TOSHIBA), the user presses the TV button 26 followed by the code search button 22. The remote 10 then samples and identifies the television as being a TOSHIBA make/model. Afterward, for all times when the TV button 26 is the last of the component selection buttons 20 pressed, the remote 10 is ready to send command signals (for example, channel and volume signals) at the press of a command signal button 24 for control of the TOSHIBA television. If any of the VCR button 28, the cable button 30 or the auxiliary button 32 is the last of the component selection buttons 20 pressed, the remote 10 will associate a different menu of command signals with the command signal buttons 24 and will not control the TOSHIBA television.

The command signal buttons 24 also include features typical of universal remote controls. A power button 34 causes the remote 10 to generate a signal to toggle a particular component on or off. Volume up and volume down buttons 36, 38 control volume for the component. A mute button 40 toggles the mute function of the component, to silence the component or enable component sound. Channel up and channel down buttons 42, 44 control channel selection. A previous channel button 46 returns to the previous channel of the component. A TV/VCR button 48 controls selection of the television signal to be displayed on the television screen (such as a television channel being recorded on a VCR or a different television channel).

Ten numeric buttons 50 are provided, one for each of the digits "1", "2", "3", "4", "5", "6", "7", "8", "9" and "0". An enter button 52 indicates that the numeric selection is completed.

Tape control buttons 54 are provided which are typically only active if either the VCR button 28 or the auxiliary button 32 are the last of the component selection buttons 20 pressed. Tape control buttons 54 include a play button 56, a stop button 58, a pause button 60, a fast forward button 62, a rewind button 64, and a record button 66.

The present invention involves an audio sampling feature incorporated into the remote 10. To accommodate the audio sampling feature, the remote 10 preferably includes a speaker 68 and a mode switch 70. The speaker 68 is preferably very thin and mounted on the rearward portion of the face of the remote 10. A grid 72 in the remote housing 12 protects the speaker 68, while providing substantial free space for sound to travel through the grid 72. The speaker 68 is preferably mounted to face upward with respect to the remote 10, so it will better project sound away from the remote 10 and around the room. In particular, a user will usually operate the remote 10 with his or her thumb, with the user's fingers and palm underneath and to the side of the remote 10. Placement of the speaker 68 at this rearward, upward facing location generally avoids interference of the sound by the user's hand.

The preferred mode switch 70 has at least a first "normal operation" and a second "audio sample operation" position. In the "normal operation" position, the speaker 68 is not active and the remote 10 operates as a traditional universal remote. In the "audio sample operation" position, the command signalling portion of the remote 10 is not active and the remote 10 operates to play audio samples. The audio samples are intended for amusement purposes, and are unrelated to the particular command signal or numeric function associated with those buttons 14.

For instance, one preferred set of audio samples are well known phrases associated with the television program "NFL PRIME TIME" which airs currently on ESPN. Each numeric button 50 has its own particular phrase or quote, voiced by Chris Berman, which has become famous due to the frequency of use of the phrase or quote on "NFL PRIME TIME" and the popularity of "NFL PRIME TIME". The preferred Chris Berman/NFL PRIME TIME samples are as follows:

| | |
|---|---|
| 1 | He could GO . . . ALL . . . THE . . . WAY!!! |
| 2 | FUMBLE! |
| 3 | Goodnight Everybody. |
| 4 | BOOM |
| 5 | RUMBLIN' . . . RUMBLIN' . . . RUMBLIN' |
| 6 | Look . . . at . . . Him . . . GO!!! |
| 7 | TOUCHDOWN!!! |
| 8 | Where's the DEFENSE?? |
| 9 | WHAAAT? |
| 0 | BACK . . . BACK . . . BACK . . . BACK |

Figure 2:
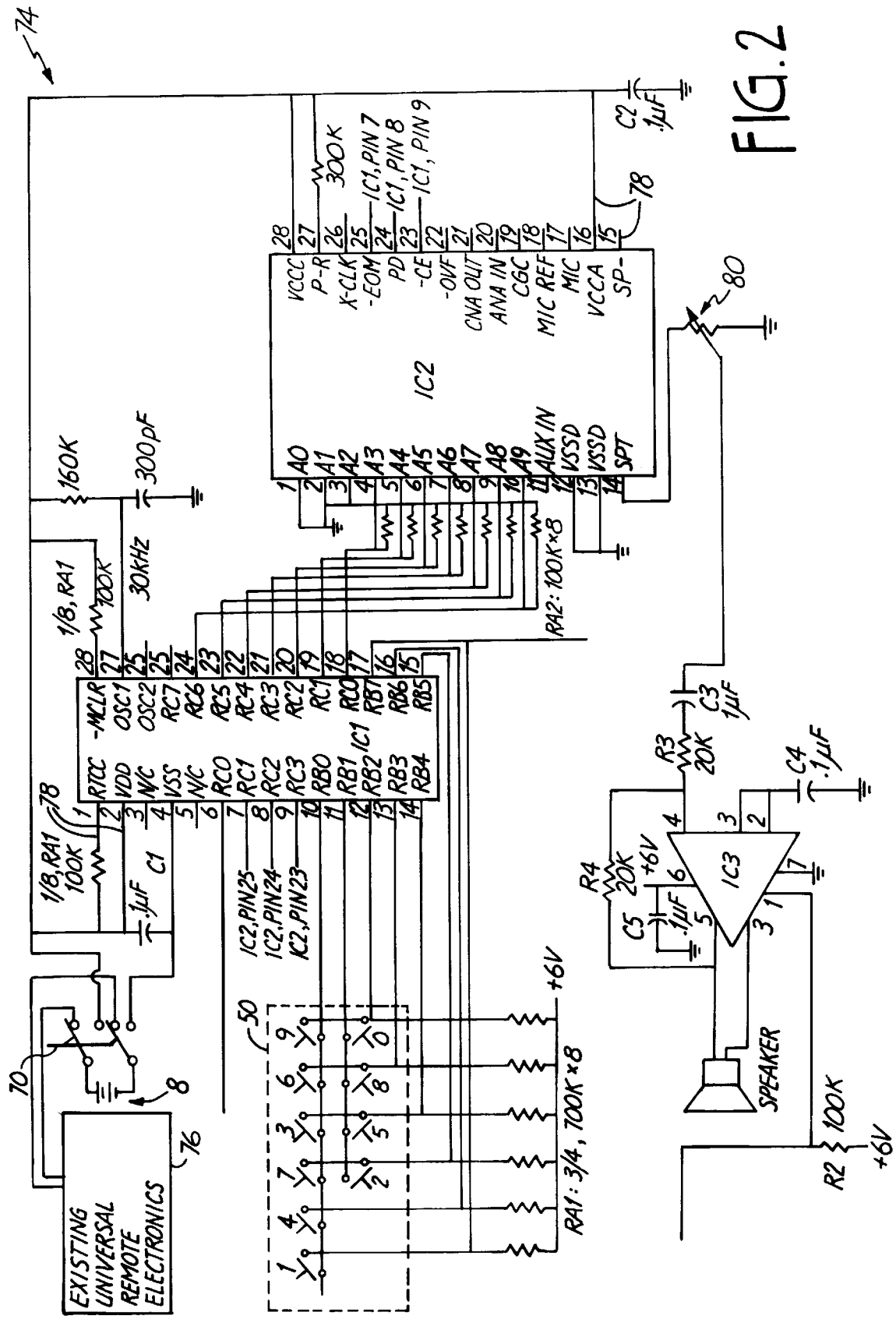
FIG. 2 is a electrical schematic of the audio sampling portion of the remote control device of FIG. 1.

FIG. 2. represents an electronic schematic for the remote 10. The electronic schematic includes the power source 18, the mode switch 70, an audio sampling portion 74 and a command signalling portion 76. The command signalling portion 76 is drawn as a block which represents the electronics for an infrared signalling universal remote as known by workers skilled in the art. In essence, other than the fact that both the command signalling portion 76 and the audio sampling portion 74 use the same physical buttons 14 and the same power source 18, the electronic circuitry for the command signalling portion 76 may be completely separate from the electronic circuitry for the audio sampling portion 74.

The mode switch 70 is preferably a double-pole double-throw switch. The mode switch 70 is shown powering the command signalling portion 76, but by the user's moving of the mode switch 70, the power source 18 alternatively powers the audio sampling portion 74. In the preferred embodiment shown in FIG. 2, only one of the command signalling portion 76 and the audio sampling portion 74 is powered at any given time. As will be described below, many alternative types of mode switches can be provided, to fulfill the desired operation of the remote.

The audio sampling portion 74 includes a first integrated circuit, IC1, a second integrated circuit, IC2, and a third integrated circuit, IC3. In general terms, IC1 performs the switching functions for the audio sampling portion 74, IC2 stores the sound information necessary for the audio sampling feature, and IC3 is an amplifier for driving the speaker 68.

The preferred IC1 includes twenty-eight pin leads 78. The numeric buttons 50 are each maintained in a normally open position between a selected two of the pin leads 78 ("10" through "17"). For instance, numeric button "1" selectively closes the connection between pin lead "17" and pin lead "10". IC1 monitors connections between the pin leads 78 and effectively determines which of the numeric buttons "1" through "0" have been pushed by the user. Others of the pin leads 78 ("7" through "9" and "18" through "24") are used for transfer of information between IC1 and IC2. While the schematic only shows numeric buttons "1" through "0" as being active for audio sampling, workers skilled in the art will appreciate that the design may easily be modified to also have any or all of the other command signal buttons 24 active for audio sampling.

The preferred IC2 also includes twenty-eight pin leads 78. Several of the pin leads 78 ("17" through "22") are used to record the audio samples on IC2 during manufacture of the remote 10. Others of the pin leads 78 ("4" through "10" and "23" through "25") are used for transfer of information between IC1 and IC2. A different pin lead 78 ("14") is used to output an electrical signal representative of the audio sample to IC3. In general terms, IC2 matches the proper one of the stored sound samples with the button 14 pressed as indicated by IC1, and sends the sound sample to the amplifier IC3. IC3 can be any amplifier as commonly known in the art.

A volume control 80 is included between the output sound signal from IC2 and the amplifier IC3. The volume control 80 may be provided by way of a dial type switch (not shown), and lets the volume for the audio sampling function be set by the remote 10. Alternatively, the volume control 80 may be set by the pressing the volume up or volume down buttons 36, 38 when the mode switch 70 is in the "audio sample operation" position. In either event, the volume control 80 preferably allows independent setting of the audio sample volume as compared to the volume on any of the components operated by the remote 10.

The amplifier drives the speaker 68 as well known in the amplifier/speaker art. Pressing of any of the numeric buttons 50 while the mode switch 70 is in the "audio sample operation" position generates the selected, stored audio sample through the speaker 68.

Many alternative versions of the present invention can be provided wherein the buttons 14 have a secondary function of activating generation of an audio sample unrelated to the primary, functional command signal generated by pressing those buttons 14. For instance, the mode switch may be designed with a third, intermediate position wherein both the command signalling portion 76 and the audio sampling portion 74 are active. The remote control with such a three-way mode switch may (a) generate command signals in silence, or (b) generate command signals in conjunction with audio features, or (c) generate audio features without generation of the command signals.

While the mode switch is in the combination "audio sample/normal operation" position, pressing of any of the numeric buttons 50 not only generates a command signal for the number of the button 50, but also plays a particular audio sample. For instance, take the example of changing the television channel to channel 14 while in the combined "audio sample/normal operation" mode, for the preferred stored audio samples given above. The user first presses the numeric button "1", at which point the remote 10 says, "He could GO . . . ALL . . . THE . . . WAY!!!" and emits an infrared signal for "1" to be received by the TV. The user then presses the numeric button "4", at which point the remote 10 says, "Look at him GO!!!" and emits an infrared signal for "4" to be received by the TV. The user then presses the enter button 52, at which point the remote 10 emits an infrared signal for "enter" to be received by the TV, which signal completes switching in the TV to change the TV to channel 14.

As a different embodiment, several different sets of audio samples may be included on IC2. For instance, each set might be associated with a particular television program, such as different sets for NFL PRIME TIME, THE SIMPSONS, SEINFELD, etc. Alternatively, each set might be associated with a particular theme or genre, such as different sets for football, baseball, basketball, etc., or different sets for sports, comedy, drama, etc. The mode switch may have multiple "audio sample operation" positions, with each position signifying a different menu of audio samples which are activated by pressing the numeric buttons 50.

As another alternative, several different sets of audio samples may be included on IC2, with each set associated with a particular component. IC2 would then also retain in memory which of the component selection buttons 20 was last pressed, and determine the menu of audio samples based on which of the component selection buttons 20 was last pressed. In this alternative, control of the TV may be done in conjunction with audio samples from famous television programs, control of the VCR may be done in conjunction with audio samples from famous movies, control of the stereo receiver may be done in conjunction with audio samples from famous disc jockeys or radio personalities, etc.

As yet another alternative, the audio samples may be selected at random by the remote 10. The random selection may be confined to the particular television program or theme selected by the mode switch, or may be confined to be associated with the particular component selection button 20 last pressed. As yet another alternative, one of the buttons 14 may randomly select an audio sample, while the remaining buttons 14 have a set, defined audio sample which can be repeated at will by the user.

Although the present invention has been described with reference to preferred embodiments, workers skilled in the art will recognize that changes may be made in form and detail without departing from the spirit and scope of the invention. For instance, workers skilled in the art will appreciate that all of the various embodiments discussed herein may be employed with one or more of the other embodiments. Workers skilled in the art will also appreciate that the present invention is not confined to universal remotes using infrared signals, but rather is fully applicable to remote controls which operate for a particular component or on other types of signals.

What is claimed is:

1. In a remote control device having a plurality of command buttons which when pressed actuate the remote control device to emit a particular command signal associated with the pressed command button to a television set operated by the remote control, the improvement being an audio sampling feature which comprises:

a memory device in the remote control device storing an audio sample associated with each of the plurality of command buttons, the audio sample being unrelated to the particular command signal associated with that command button, wherein the each of the audio samples is taken from a single television program; and a speaker in the remote control device which, when one of the plurality of command buttons is pressed, plays the audio sample associated with the pressed command button.

2. The remote control device of claim 1, wherein the improvement further comprises:

a switch on the remote control device for activating and deactivating the audio sampling feature.

3. The remote control device of claim 2, wherein the switch also activates and deactivates the emission of command signals from the remote control device.

4. The remote control device of claim 1, wherein the remote control device is a universal remote control device.

5. The remote control device of claim 1, wherein the memory device stores a plurality of audio samples associated with each of the plurality of command buttons.

6. The remote control device of claim 1, wherein each of the plurality of command buttons, when pressed, actuate the remote control device to emit a command signal associated with one of the numerical digits 1 through 0.

7. The remote control device of claim 1, wherein the memory device stores a plurality of sets of audio samples, each of the audio samples in a particular set being part of a theme and each set of audio samples having a different theme, the improvement further comprising:

a switch on the remote control for selecting between sets of audio samples.

8. The remote control device of claim 1 further comprising an amplifier for the speaker.

9. In a remote control device having a plurality of command buttons which when pressed actuate the remote control device to emit a particular command signal associated with the pressed command button to a television set operated by the remote control, the improvement being an audio sampling feature which comprises:

a memory device in the remote control device storing a plurality of audio samples associated with each of the plurality of command buttons, the audio sample being unrelated to the particular command signal associated with that command button, the audio samples being stored in a plurality of sets of audio samples, each of the audio samples in a particular set being part of a theme and each set of audio samples having a different theme;

a switch on the remote control for selecting between sets of audio samples; and a speaker in the remote control device which, when one of the plurality of command buttons is pressed, plays the audio sample associated with the pressed command button.

10. A remote control device for operating a television set, comprising:

a plurality of command buttons;

a first memory device storing a command signal associated with each of the plurality of command buttons;

an emitter which, when one of the plurality of command buttons is pressed, emits the stored command signal associated with the pressed command button; and an audio sampling feature which comprises:

a second memory device storing a plurality of audio samples associated with each of the plurality of command buttons, the audio sample being unrelated to any of the command signals, the audio samples being stored in a plurality of sets of audio samples, each of the audio samples in a particular set being part of a theme and each set of audio samples having a different theme;

a switch on the remote control for selecting between sets of audio samples; and a speaker which, when one of the plurality of buttons is pressed, plays the stored audio sample associated with the pressed command button.

11. The remote control device of claim 10, further comprising:

a switch for activating and deactivating the audio sampling feature.

12. The remote control device of claim 10, wherein the remote control device is a universal remote control device, wherein the first memory device stores a plurality of sets of command signals, each set of command signals associated with a different component.

13. The remote control device of claim 10, wherein the second memory device stores a plurality of audio samples associated with each of the plurality of command buttons.

14. The remote control device of claim 10, wherein each of the plurality of command buttons, when pressed, actuate the remote control device to emit a signal associated with one of the numerical digits 1 through 0.

15. The remote control device of claim 10, wherein the component is a television set, and wherein the each of the audio samples is taken from a single television program.

16. The remote control device of claim 10 further comprising an amplifier for the speaker.

17. A remote control device for operating a television set, comprising:

a plurality of command buttons;

a first memory device storing a command signal associated with each of the plurality of command buttons;

an emitter which, when one of the plurality of command buttons is pressed, emits the stored command signal associated with the pressed command button; and an audio sampling feature which comprises:

a second memory device storing an audio sample associated with each of the plurality of command buttons, the audio sample being unrelated to any of the command signals, wherein each of the audio samples is taken from a single television program; and a speaker which, when one of the plurality of buttons is pressed, plays the stored audio sample associated with the pressed command button.

* * * * *